United States Patent [19]

Maier-Laxhuber et al.

[11] Patent Number: 4,660,629
[45] Date of Patent: Apr. 28, 1987

[54] CONTINUOUSLY ACTING ADSORPTION DEVICES AND PROCESS FOR THEIR OPERATION

[76] Inventors: Peter Maier-Laxhuber, Saumweberstrasse 14, 8000 Munchen 60; Fritz Kaubek, Gasparistrasse 5 A, 8000 Munchen 71, both of Fed. Rep. of Germany

[21] Appl. No.: 668,028

[22] Filed: Nov. 5, 1984

[30] Foreign Application Priority Data

Nov. 28, 1983 [DE] Fed. Rep. of Germany ....... 3342985

[51] Int. Cl.[4] .................... F25B 15/00; B60H 1/06; B60H 1/32
[52] U.S. Cl. ................... 165/104.12; 165/86; 165/43; 62/478; 62/480; 62/101
[58] Field of Search .............. 165/104.12, 86; 62/478, 62/480, 101

[56] References Cited

U.S. PATENT DOCUMENTS

| 3,125,159 | 3/1964 | Lindberg, Jr. ................ 165/104.12 |
| 4,121,432 | 10/1978 | Weil et al. .................. 165/104.12 |
| 4,169,362 | 10/1979 | Weil et al. . | |
| 4,402,915 | 9/1983 | Nishizaki et al. .............. 165/104.12 |
| 4,479,364 | 10/1984 | Maier-Luxhuber . | |
| 4,574,874 | 3/1986 | Duran ........................ 165/104.12 |

FOREIGN PATENT DOCUMENTS

| 3016290 | 11/1980 | Fed. Rep. of Germany . | |
| 27155 | 3/1978 | Japan ....................... 165/86 |
| 108955 | 8/1979 | Japan ................... 165/104.12 |
| 108099 | 8/1981 | Japan ....................... 165/86 |

Primary Examiner—Albert W. Davis, Jr.
Attorney, Agent, or Firm—Hoffmann, Dilworth, Barrese & Baron

[57] ABSTRACT

A plurality of adsorption containers are provided which are separated into heater adsorber zones and condenser evaporator zones. The zones are successively rotated through flow segments which form a passageway for heat carrier flows. The heater adsorption zones contain an adsorption substance from which an operating substance is extracted by adsorbing heat from a heat carrier flow and is again adsorbed by emitting heat to a further heat carrier flow. The operating substance condenses and evaporates by means of a heat exchange with further heat exchangers. The adsorption devices are suitable as cooling devices and heat pumps as well as heat transformers and heat exchangers.

16 Claims, 5 Drawing Figures

CONTINUOUSLY ACTING ADSORPTION DEVICES AND PROCESS FOR THEIR OPERATION

BACKGROUND OF THE INVENTION

In general the present invention deals with adsorption devices of the type where there are at least two gas tight closed adsorption containers. The containers include heater adsorber zones filled with adsorption materials capable of adsorbing and deadsorbing an operating substance and condenser evaporator zones which condense the operating substance or readsorb it in a further adsorption substance.

Heat may be transferred with adsorption devices from a first heat carrier to a second one at a higher temperature. The adsorption devices are separated into continuous and periodic systems. An operating substance is adsorbed exothermically in an adsorption substance in both systems and is again deadsorbed in an endothermic reaction.

Periodic processes are possible only with solid non-pumpable adsorption substance. An adsorption substance charged with operating substances is provided in a gas tight adsorption zone, namely a heater adsorption zone. The operating substance is deadsorbed from the adsorption substance by an external heat transfer, namely the cooling. In a zone of the adsorption container which is cooled from the outside, namely the condenser evaporator zone, the operating substance can condense. The released heat is transmitted through the walls of the condensor evaporator zone to a heat carrier flow. The boiling adsorption zone is cooled so as to return the system to its initial state. Therefore, the adsorption substance can then adsorb the previously extracted operating substance. Adsorption heat is released due to the exothermic reaction which is adsorbed by heat carrier flows provided outside of the boiling adsorption zone. The operating substance evaporates in the condensor evaporating zone at lower temperatures by adsorbing heat from a further heat carrier flow.

The operating substance pressure in the adsorption container and the operating substance condensation in the adsorption substances are only dependent on the temperature level of the heat carrier and adapt more or less rapidly to each outside change of this temperature level according to their reaction kinetics. Known adsorption and operating substances require a few hours under unfavorable conditions.

The control of the heat carrier temperatures is expensive and complicated. Continuous refrigeration is not possible with a signal adsorption container. A quasi-continuous cooling process in only possible with an encasing of a plurality of adsorption containers and a phased displaced operating mode. They make the installation more expensive and prevent mobile use due to the additional mass. The changeover from one mode of operation to another, for example, from a heat pumping operation to a simple heat exchanger operation or a heat transfer operation is not possible.

SUMMARY OF THE INVENTION

It is therefore an object of the present invention to construct suitable adsorption devices for a plurality of novel, solid adsorption substances which permit a continuous operating mode. The adsorption devices are designed to make advantageous use of the characteristics of the novel adsorption substances and to permit the use of all known operating modes within only a single design. The controls are greatly simplified when compared to the controls of known processes. With this in mind, the devices are useable in motor vehicles due to the feasibility of limiting to a few the number of adjustment and control members.

The objects of the present invention are also carried out by providing a plurality of gas tight closed adsorption containers which contain in one zone, namely the boiling or heater adsorber zone, an adsorption substance, and in another zone, an operating substance or readsorb in a second adsorption substance. The containers are rotated by a mutually rotating axis. The adsorption containers are arranged around the rotating axis in a manner that all heater adsorber zones are located within a first rotational element and all condenser evaporator zones are located within a second rotational element which is not penetrated by the first rotational element. In this manner, the rotational elements are admitted or traversed by separated flowing heat carriers which are fed in separate flow segments. During a complete rotation around the rotational axis all zones pass through the temperature level in the correct succession which is required for the total cycle. During through flow of the individual flow segments, the heat carrier flows adsorb heat from the passing adsorption container zones or emit heat to them.

Thus, it is possible to eliminate a complicated adjustment and control required in the process for the heat carrier flows. The total heat carrier control is taken over by the rotational movement which guides the correct asorption containers through the correct flow elements. An adjustment to fluctuating temperature levels or volume flows of the heat carrier is taken over by the used pair of adsorption substances in a complete self-regulating manner by changes in steam pressure of the operating substance and by changing the concentration in the adsorption substance.

Due to a particular design and arrangement of the adsorption containers, it is possible to further simplify the adsorption devices. The adsorption containers are designed as identical flat and wedge-like containers with uniform limiting edges for preventing an admixing of individual heat carrier flow within the rotational elements as well as to prevent a high pressure drop for the operating substance within the adsorption container and also for the heat carriers outside of the adsorption containers. A sealing of the flow segments against each other and against the outer space is performed with the assistance of proven and known conventional processes from the "rotor"-heat exchanger technology. The rotational movement of the adsorption container is obtained without additional elements if the adsorption container walls are placed against the flow direction of the heat carrier. The same effect can be obtained if the rotating axis is positioned hermetically and if the flow segments are correctly mounted. It is then possible to induce a torque by shifting the weight of the operating substance with flows in the half of the rotational element torwards the rotating axis and at the other half away from the rotational axis outwardly.

Principally, all substances having a lower steam pressure in comparison to the used operating substance and which assure a sufficient steam pressure reduction for the adsorbed amount of the operating substance are suitable as an absorptive substance. Suitable are all alkalai and earth alkali salts, the bentonites, the silica gels and the activated carbons known for the refrigeration technology. The adsorption substances result in sufficient adsorption characteristics together with the operating substances water, methanol and ammonia. Particularly well suited is the adsorption substance is zeolite which permits evaporation temperatures around 0 degrees centigrade as well as boiling temperatures above 350 degrees centigrade. In cooperation with the operating substance water in this manner, the obtainable temperatures are above 100 degress centigrade. The reaction speeds and the cycle stability are unusally high. Further advantageous characteristics are an unlimited extraordinary good environmental compatibility and a low manufacturing price. The operating substance water freezes at temperatures below 0 degrees centigrade. For certain applications it is rather disadvantageous. However, when it is correctly used the phase transfer solid-liquid can be advantageously used in the function of an additional latent heat storage.

Phase transfers by expansion evaporation of the operating substance do not result in a volume expansion. The combination of the adsorption substance zeolite in the hot plate or heater adsorber zones with a further adsorption substance for water in the condenser evaporator zones, for example, bentonite, salt or activated carbon permits a position and shock independent use of the adsorption devices. Therefore, the 0 degree limit is also nullified. Similar advantages are true for the use of two different metal hydrides as adsorption substances and hydrogen as the operating substance. The reaction heat of the adsorption reactions are higher in this case, as well as the adsorption container pressures.

In a further embodiment of the invention, adsorption substances for water are also applied on the outer faces of the adsorption container. This is particularly advantageous for the use of the adsorption devices in air conditioners. In order to dehumidify air flows, the evaporation temperature of the operating substance in the condenser evaporator zones must not be below the dew point of the air flow in these cases. The reaction heat which is released during the adsorption of the air humidity in the adsorption substance is immediately adsorbed by the condenser evaporator zone and is fed by the operating substance into the heater adsorber zone to a higher temperature. Therefore, air flows can be dehumidified, cooled or heated in one operating step.

Pumps and ventilators are customarily used for feeding the heat carriers. With suitable transmissions for the required drive motors they can also take over the rotating movements of the adsorption containers. The possible saving in weight cost reduction is particularly advantageous for the use in motor vehicles.

During a full rotation of the adsorption containers around the rotating axis all heater adsorptions zones run successfully in accordance with the flow segments of the first rotation element for the functions of boiling, cooling, adsorbing and heating. At the same time in a phase coincidence manner, all condenser evaporator zones of the corresponding adsorption container pass the flow segments of the second rotation element for the functions condensing, cooling, evaporating and heating. The flow elements for the functions of cooling and heating are not required for the operation in accordance with the invention. They are not required in simplified adsorption devices.

However, if one lets a heat exchanger such as a floating heat carrier circulate between these flow segments for heat exchange purposes, the obtainable heat ratios of the adsorption devices can be considerable increased. The specific heat capacities of the adsorption and operating substance as well as of the adsorption containers can be advantageously shifted in this manner. The result is higher heat or cold flow efficiency with a reduced use of boiling heat.

The rotating movement of the adsorption containers permits, with a suitable flow feeding of the heat carriers (for example, due to flow deflection or a plurality of passages), sliding temperatures in the adsorption containers and also in the heat carriers themselves. Therefore, the temperature gradient within the flow segments can be advantageously used for a substantial cooling or heating of the heat carriers.

In paticular the heat content of hot combustion gases in the flow segments can be used for the function of boiling and/or heating and, in this manner, also for the adsorption temperatures. With these combustion gases, in that the heat carriers flow successively or simultaneously through a plurality of flow elements for different functions, subsequently flowing through the flow segments of the second rotational element for the function of boiling and/or evaporating, the heat content can still be considerably better used than in the so-called "calorific value devices". Simultaneously, impurities which pollute the environment can be better separated in view of the substantial cooling. It appears to be advantageous if one heat carrier simultaneously flows through a plurality of flow segments performing different functions, for example cooling air through the flow segments cooling, adsorption, heating, evaporating and cooling off. Naturally, it would then not be necessary to limit or isolate these flow segments from each other. This is a decisive step on the way to a simple, economical and light adsorption device.

It should also be noted that, in the present invention, it is possible to control the rotating frequency of the adsorption container in accordance with the temperatures of the individual heat carrier flows or in accordance with the temperatures of the adsorption containers or the content thereof. In the first case one obtains, for example, uniform discharge temperatures of individual heat carrier flows independent from the changing input temperatures or volume flows of the other heat carriers. In the second case, an overheating of individual adsorption containers is excluded or a particular favorable operating point can be maintained for the pair of adsorption substances used.

Also, it is provided that the temperatures of the discharging heat carriers can be obtained by displacing the associated flow segments with respect to the others. For example, the discharge temperature of the heat carrier flow can be changed from "cold" to "warm" by displacing the flow segments for the function of evaporating to the position of the flow segment for the function of condensing. Thus, in this manner, a change in the mode of operation occured for the adsorption device due to this displacement, in that a change occured from a cooling device to a heat pump.

This change of mode of operation can also be performed by a simple deflection of the heat flows. An adsorption device may be used for cooling and also for heating by means of a simple flap or valve adjustments in the heat carrier flow conduits. Therefore, previously known hot water heating systems and compressor air condtioners which are driven with mechanical energy in motor vehicles can now be replaced by installing the most simple adsorption devices. A dehumidification of the supply air can now be performed without any additional effort, and this should be kept in mind when observing that drying substances can be applied to the outer faces of the adsorption containers. In addition to savings in the gas consumption, the vehicle weight may also be reduced by eliminating the conventional heating system. A further weight and cost saving may occur when the flow element for the function of boiling also takes over the function of a muffler in the exhaust. An additional manifold can then be eliminated.

The adsorption device can be operated as a heat transformer. The flow elements for the evaporation and boiling function are fed with heat carriers having a mean temperature. For the adsorption function, heat carriers with a high temperature are available for the flow elements.

The adsorption devices are also usable as heat exchangers with heat-pipe-effect. The heat carriers to be cooled are fed through the flow segments for the evaporation and/or boiling function and the heat carriers to be heated are fed through the flow segments for the adsorption and/or condensing function.

The adsorption devices are also usable as a regenerative heat exchanger. The heat carriers to be cooled are fed through the flow segments for the boiling and/or condensing functions and the heat carriers to be heated are fed through the flow segments for the adsorbing and/or evaporating function.

When using the adsorption device as a regenerative heat exchanger, the mode of operation is similar to known "rotor"-heat exchangers. When it is used a a recooperative heat exchanger, no impurities of the exhaust flows can enter into the air supply flows.

The adsorption devices may be used particularly advantageously in air conditioning installations with heat recovery from the exhaust air. In such installations, a simple heat exchange between the air supply and the air exhaust is sufficient in certain time intervals. The adsorption device may also operate as a heating pump or as a cooling device when there is a higher demand of heat or cooling by simply connecting an outside heat source (for example, oil or gas burners). Many times this change will be possible without any additional flap adjusting in the ventilation conduits. Only the temperature level of the heat carrier determines the mode of operation of the adsorption devices. The pair of adsorption substances automatically adjust to every change in the adsorption containers.

There are number of different types of acceptable adsorption substances. A number of zeolites are useable such as type A zeolite (for example, MG-A, NA-A, CA-A), type X zeolite (for example CA-X) and type Y zeolite (for example NA-Y, H-Y) activated carbons, silica gels, bentenites, salts such as desiccating salts (for example $CACL_2$, $MGCL_2$, LIBR) and metal hydrides. Materials such as water, methanol, amonia, freon or hydrogen are used as an operating substance.

With the above objectives in mind, reference is made to the attached drawings.

DETAILED DESCRIPTION

Figure 1:
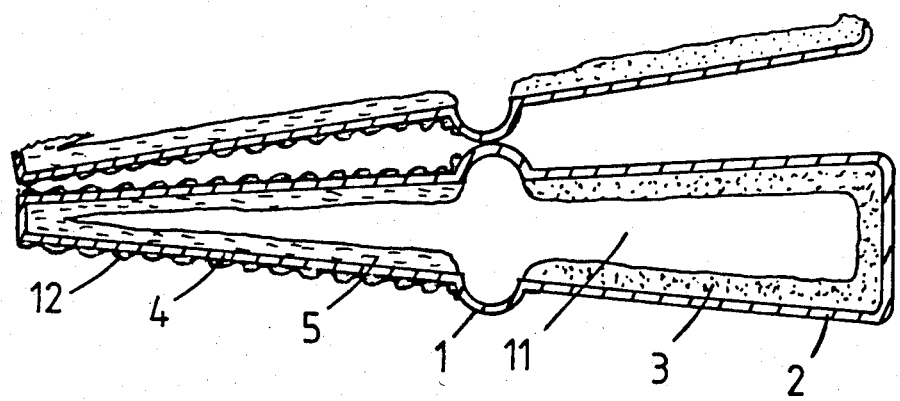
FIG. 1 illustrates an adsorption container of the invention in a sectional view.

FIG. 1 illustrates a sectional view of an adsorption container 1. It consists of two semicups made in accordance with the cupping process and made from metal or glass being welded together after filling. The hot plate or heater adsorber zone 2 contains a first adsorption substance 3. Steam conduits in the center permit a better distribution of the operating substance steam. The condenser evaporator zone 4 contains a second adsorption substance 5.

Figure 2:
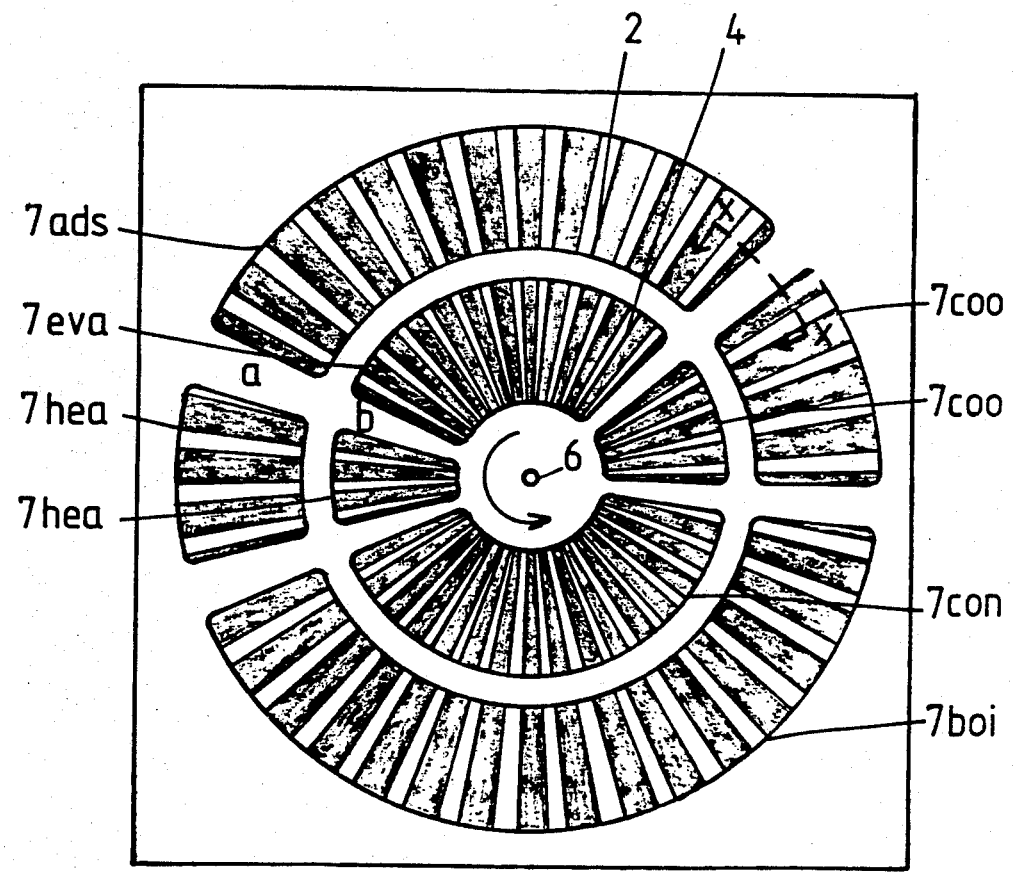
FIG. 2 illustrates an adsorption device with adsorption containers and flow segments.

In FIG. 2 a plurality of adsorption containers are arranged circular-like in a radial direction around an axis of rotation 6. Therefore, all heater adsorber zones 2 are located within a first rotation element a during the rotating movement around the rotational axis 6, while all condenser evaporator zones 4 are located within a second rotation element b. Flow segments 7 are left open in the stationary rotation elements a and b through which the heat carriers of different temperatures may flow. All flow segments 7 will be passed during a rotation of the adsorption containers 1 around rotating axis 6, that is, the flow segments 7 for the functions of boiling, adsorbing and heating of the heater zones and the flow elements 7 for the functions of condensing, cooling, evaporating and heating of condenser evaporator zones.

Figure 3:
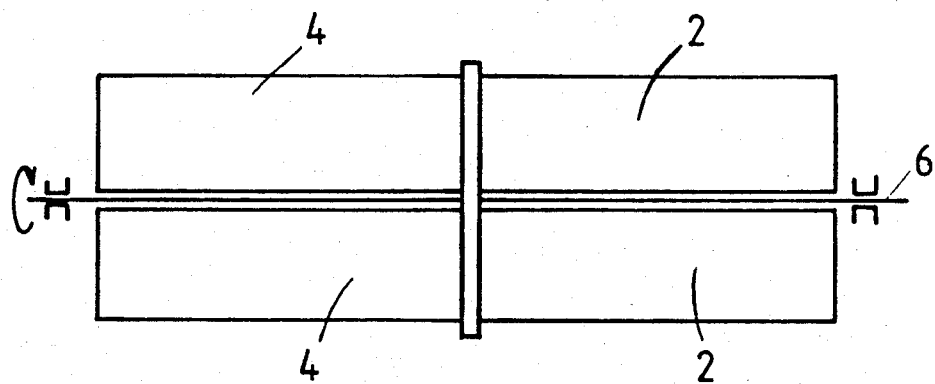
FIG. 3 illustrates a further arrangement of the adsorption container around the rotational axis.

FIG. 3 illustrates a further arrangement possibility of the adsorption containers 1 around axis of rotation 6. The design and the arrangement of the adsorption container 1 can be substantially adapted to the situations in which they are going to be used.

Figure 4:
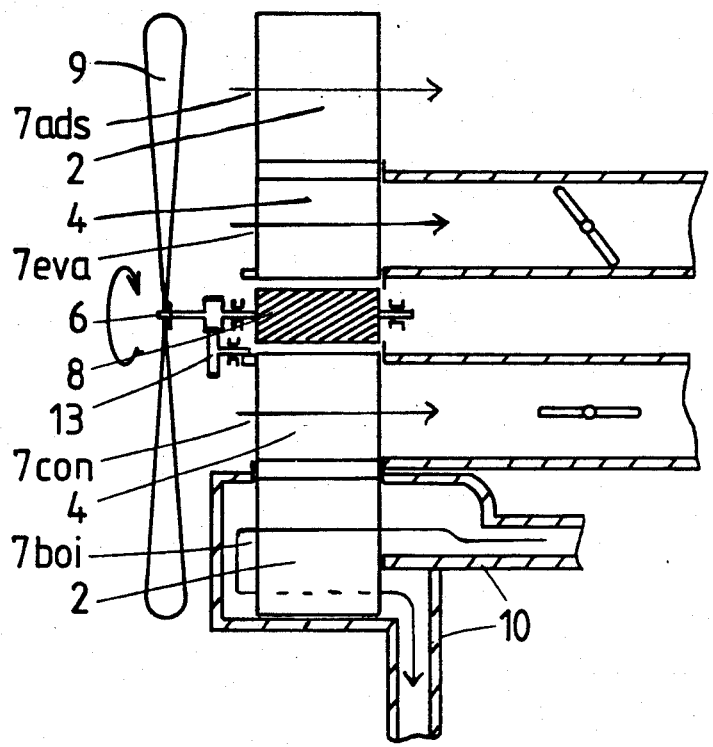
FIG. 4 illustrates a sectional view through an adsorption device for a selective heating or cooling of a motor vehicle.

FIG. 4 illustrates a sectional view through an adsorption device in the operation mode as an air conditioning and heating device for motor vehicles. An electric motor 8 with a propeller 9 is mounted on the axis of rotation 6. This electric motor 8, by means of a conventional drive 13, provides the rotating movement of the adsorption container 1. The exhaust 10 of the internal combustion motor is connected to the flow elements 7 for the function of boiling. Air conduits with shut-off flaps or valves lead from the flow elements 7 for the functions of evaporating, heating, condensing and cooling into the inside of the motor vehicle. The air temperature for the inside of the motor vehicle can be controlled by adjusting the shut-off flaps. Since the adsorption device simultaneously "cools" and "heats" during operation, both air flows could be simultaneously used. In this manner, for example, it is possible to cool the side of a space being exposed to sunshine and to heat the side facing away from the sunshine. Naturally, all forms of heat recovery in the ambient air operation are possible. Particularly advantageous is the fact that the heater adsorption zones which are in engagement with the exhaust gas are not engaged by the supply air flows for the air space of the motor vehicle.

As depicted in FIG. 1, an adsorption material 12 can be mounted in a conventional manner on the outside of each container as a drying substance.

Figure 5:
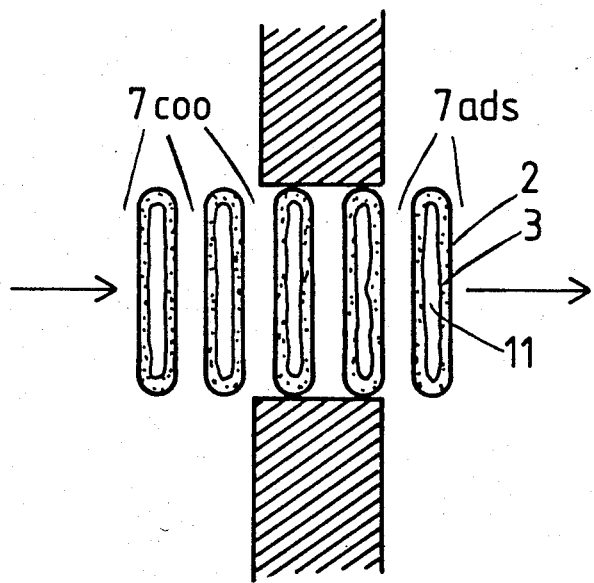
FIG. 5 illustrates a sectional view taken along the plain of line x—x of FIG. 2.

As previously pointed out, the present invention is designed so that the ends of each container 1 exchange heat alternately with heat emitting and heat adsorbing heat carried flows during a rotation of a rotor. The zones are separated from one another so that there is not a harmful admixing of the heat carrier flows with respect to the rotating containers. This becomes clear when viewing FIG. 5. Each container, one is circulated by heat carrier medium the heat carrier mediums are separated by a border or wall between the flow segments. As depicted, the flow segments 7coo, the segment for cooling and 7ads, the segment for adsorption are separated by a border.

This is further depicted in FIG. 2 and 4 where the individual segments 7 are provided with abbreviations of the respective functions. In addition to the "ads" and "coo" zones "hea" designates the heating zone, "eva" designates the evaporation zone, "con" designates the condensation zone, and "boi" designates the boiling zone.

As depicted, the flat hermetically sealed containers 1 are arranged radially around a shaft 6 like flat spokes of a wide wheel. The arrangement rotates slowly around the wheel axis 6. Each container 1 consist of two interconnected compartments or zones 2 and 4.

Each compartment contains a certain adsorbent, e.g., zeolite and a working fluid which can be absorbed in it, e.g., water. The two compartments 2, 4, one close to the rim and one close to the shaft 6 are connected by means of a widened section of the container.

The widened section of neighboring containers abut, connect and seal with one another and this arrangement results in two sets of air channels in the axial direction between the containers. The first set is close to the rim and forms a rotational element a and the second is close to the shaft 6 and forms a rotational element b.

In the embodiment depicted in FIG. 4 a sector of the channels close to the rim is passed by the exhaust gases from the exhaust 10. A selected sector of the channels close to the shaft 6 applies the cooling power or, alternatively, heating power to an air stream. The interconnected containers rotate and revolve while the ducts for air exhaust gases remain stationary.

In operation, hot exhaust gases from the exhaust 10 pass the channels close to the rim and heat the absorbent inside the outer part of the sealed containers. While rotating slowly, the working fluid in the adsorbent is vaporized (deadsorbed) and moves to the cooler shaft-side zone of the container. There the vapor condenses and supplies heat to the air stream passing through the shaft side channels. Hot air produced in this manner can be used for heating.

As the containers revolve around the central shaft 6, they are no longer heated by the exhaust gases. Both zones or compartments of each container are cooled to the ambient temperature by passing air through the channels.

The cooling of the run-side containers starts the readsorbtion of working fluid. The cool adsorbent takes up gaseous working fluid and the vapor pressure in the containers decreases. Due to the absence of air, the water in the shaft-side compartment or zone of the container evaporates to supply more vapor which is also adsorbed. The evaporation takes place at very low temperature (e.g. 0° C. = 32° F.). The heat of the evaporation is supplied by a air stream past through this sector of the run-side compartments or zones. The exiting cooled air streamed can be used for air conditioning the passengers compartment in a motor vehicle.

The adsorbent adsorbs water vapor and heats up. The heat of adsorption is rejected to the air passig through the rotor.

As the structure keeps rotating, the process inside a specific container undergoes the above steps in a repetitive manner. The large number of containers insures a continuous supply of heat and air conditioning power.

Thus, the several aforenoted objects and advantages are most effectively attained. Although several somewhat preferred embodiments have been disclosed and described in detail herein, it should be understood that this invention is in no sense limited thereby and its scope is to determined by that of the appended claims.

What is claimed is:

1. An adsorption system comprising; at least two gas tight closed adsorption containers consisting of heater adsorber zones which are filled with adsorption material capable of adsorbing and deadsorbing an operating substance and condenser evaporator zones which condense the operating substance or readsorb it in a further adsorption substance, the adsorption containers being rotatable together about a rotational axis so that all heater adsorber zones are located within a first rotational element and all condenser evaporator zones are located within a second rotational element which is radially spaced from said first rotational element and which is not penetrated by the first rotation element, the rotational elements being separated in stationary flow segments which are traversed by separated heat carrier flows, the zones capable of being rotated so as to alternately exchange heat with heat emitting and heat adsorbing heat carrier flows, and adjacent adsorption containers being adapted to exchange heat with the same heat carrier flows.

2. The invention in accordance with claim 1 wherein the adsorption containers are formed and arranged to include means to exclude admixing of the heat carrier flows within the rotational elements, means to provide for adequate sealing of the stationary heat carrier segments against the rotating adsorption containers by use of regenerative "rotor-heat" exchangers, means to induce a torque to the adsorption container with the aid of the heat carrier flows and mean to effect a torque around the rotational axis by displacing the operating substance in the adsorption containers.

3. The invention in accordance with claim 1 wherein the adsorption substances is selected from the group consisting of zeolites, activated carbons, silica gels, bentonites, desiccating salts and metal hydrides and the operating substance is selected from the group consisting of water, methanol, ammonia, freon and hydrogen.

4. The invention in accordance with claim 1 wherein drying substances are applied on the outer surfaces of the adsorption containers.

5. The invention in accordance with claim 1 wherein the adsorption containers are rotated by a ventilator motor and a drive.

6. The invention in accordance with claim 1 wherein means is provided to rotate the containers so that during a full rotation of the adsorption containers around the rotational axis all heater adsorber zones successfully pass through separated flow segments for the functions of boiling, cooling, adsorbing and heating, while the condenser evaporator zones run in phase also through he separated flow segments for the functions of condensing, cooling evaporating and heating.

7. The invention in accordance with claim 6 wherein heat exchange means is provided so that predetermined positioning of the flow segments with respect to the heat carrier flows provides for exchange of heat between the flow segments and the heat carrier flows for the heating and cooling function.

8. The invention in accordance with claim 1 wherein the heat carrier flows in the flow segments flow against the temperature gradients of the passing by adsorption containers.

9. The invention in accordance with claim 1 wherein the heat carrier flows flow successively through a plurality of flow segments for different functions.

10. The invention in accordance with claim 1 wherein the rotating frequency of the adsorption containers is controlled in accordance with at least one of the temperatures of individual heat carrier flows and the temperatures of the adsorption containers.

11. The invention in accordance with claim 1 wherein means is provided for displacing the flow segments within the rotational elements in order to prevent changing of at least one of the temperature of the heat carrier flows and the mode of operations of the adsorption devices.

12. The invention in accordance with claim 1 wherein selective heating and cooling means is provided so that for the boiling function the hot heat carrier flows are fed into the flow segments, for cooling purposes the heat carrier flows from the flow segments for the evaporation function are used, while the heat carrier flows from the flow segments for the condensing and/or adsorbing functions are preferably used for heating.

13. The invention in accordance with claim 1 wherein heat transformer means are provided by the adsorbtion devices whereby the flow segments for the evaporation and boiling function are fed with heat carrier flows having a mean temperature and for the adsorbtion function heat carrier flows with a high temperature are available from the flow segments.

14. The invention in accordance with claim 1 wherein heat exchanger means with heat-pipe-effect is provided by using the adsorbtion devices so that the heat carrier flows to be cooled are fed through the flow segments for the evaporation and/or boiling function and the heat carrier flows to be heated are fed through the flow segments for the adsorbtion and/or condensing function.

15. The invention in accordance with claim 1 wherein a regenerative heat exchanger is provided by using the adsorbtion device so that the heat carriers to be cooled are fed through the flow segments for the boiling and/or condensing functions and the heat carriers to be heated are fed through the flow segments for the adsorbing and/or evaporating function.

16. The invention in accordance with claim 1 wherein the heat carrier flows flow simultaneously through a plurality of flow segments for different functions.

* * * * *